United States Patent Office.

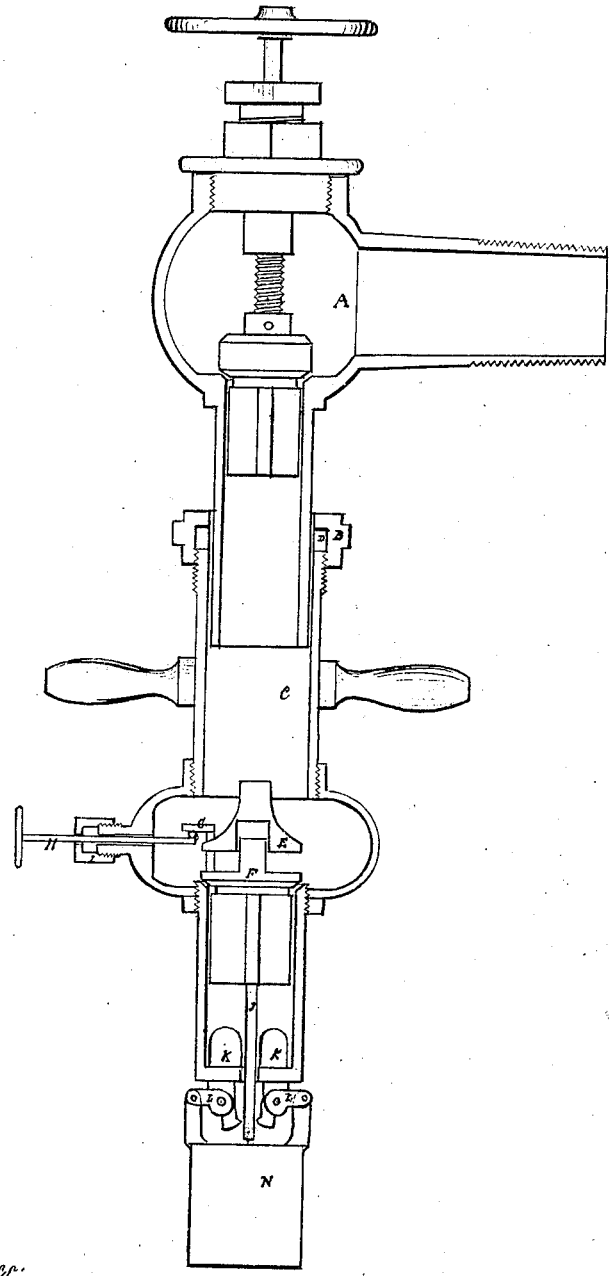
F. Stitzel,
Barrel Filler.
No. 109,071. Patented Nov. 8, 1870.
Witness:
E. F. Huyck
W. W. Pullen
Inventor.
Frederick Stitzel

FREDERICK STITZEL, OF LOUISVILLE, KENTUCKY.

Letters Patent No. 109,071, dated November 8, 1870.

IMPROVEMENT IN BARREL-FILLERS.

The Schedule referred to in these Letters Patent and making part of the same.

I, FREDERICK STITZEL, of the city of Louisville, county of Jefferson and State of Kentucky, have invented a certain new and useful Improvement in a device for Filling Barrels with Whisky or other similar liquids, of which the following is a specification.

The first part of my invention consists in a simple valve-cock, the entrance and discharge ends being at right angles, one end being screwed so as to hold it to the tank, while the other is made plain so as to enter the end of another small sleeve or pipe, on the upper end of which is a screw-nut forming a packing-box, which is filled with packing to prevent its leaking as it is drawn out in order to regulate the length; and to the lower end of this last-named sleeve is attached a small button-shaped guard, about the size of the valve, but so made as not to obstruct the opening in the pipe; and to this guard is hung, by means of a hook, a small valve, the upper stem of which enters the guard, which prevents it from rising out of its place.

The pipe at this point has a large ball-shaped chamber around the valve, the seat for which is formed on the end of the next section of the pipe, which is screwed in the under side of the chamber, the wings of the valve fitting closely in the pipe, which acts as a guide for it; and, in the lower end of the valve-wings, is inserted a small pin, long enough to reach down through the inclosed end of the pipe (the opening being in the sides) a sufficient distance to be operated by a small float below, which is attached to small levers secured to the lower end of the pipe by lugs, in which they work loosely. These levers are made in the form of an angle, the lower ends being close to the pin of the valve, and made sharp on the side next the rod, to act as a catch to hold it firmly while the weight of the float is on the levers; but as soon as the liquor touches the float and raises it up, it detaches the valve-pin, and lets it fall and close the valve when the barrel is full; and in order to set it again ready for another, the valve is raised up again by means of a small stem in the side of the chamber opposite the valve. The inside end of this stem is bent to an angle, forming a trigger to raise the valve, which is done by its acting against a similar one in the valve; but as soon as the valve is raised the trigger is turned out of the way so that the valve may fall unobstructed, and close when the barrel is full, in order that it may be self-acting.

Having thus fully described my invention, it may be more fully understood by reference to the drawing.

A is the valve-cock.
C is the sliding sleeve by which the length is adjusted.
B is the packing-box.
D is the packing.
E is the valve-guard.
F is the valve.
G is the trigger.
H is the stem or crank by which the valve is raised.
I is the packing-box.
J is the stem in the lower end of the valve.
K K are the openings in the lower end of the pipe.
L L are the catch-levers that hold the valve up while the barrel is filling.
N is the float by which they are operated.

Having thus fully described the drawing,
What I claim as my invention is—

1. The combination of the float N, the lever-catches L L, the valve F, and stem J, the guard E, trigger G, the crank-stem H, and openings K K in the lower end of the pipe, substantially as and for the purposes set forth.

2. The combination of the sliding sleeve-joint C, the screw-nut B, the packing D, and valve-cock A, substantially as and for the purpose herein set forth.

FREDERICK STITZEL.

Witnesses:
  E. F. HUYCK,
  W. W. PULLEN.